Oct. 6, 1959 R. B. McINTOSH ET AL 2,907,902
LOW LEVEL SIGNAL COMMUTATOR
Filed March 4, 1957

INVENTORS.
ROBERT B. MCINTOSH
DALE E. ST. JOHN
BY
Christie, Parker & Hale
ATTORNEYS

United States Patent Office 2,907,902
Patented Oct. 6, 1959

2,907,902

LOW LEVEL SIGNAL COMMUTATOR

Robert B. McIntosh, Inglewood, and Dale E. St. John, Torrance, Calif., assignors to Arnoux Corporation, Los Angeles, Calif., a corporation of California Application March 4, 1957, Serial No. 643,714

5 Claims. (Cl. 307—149)

This invention relates to commutators, and more particularly, is concerned with commutating means for connecting a number of low voltage level signals successively to a common output circuit.

There are many applications, such as measurements of thermocouple potentials of a plurality of thermocouples, where it is necessary to commutate low level signals into a fairly high impedance. Ordinary switching arrangements for commutating the low level signals also commutate any noise signals present which may be of objectionably high magnitude in relation to the low level signals being measured. Various means have been proposed for minimizing noise in the presence of low level signals, one means being to use a balanced load and commutating from sources which are floating with respect to ground. However, in many applications it is not possible to isolate the source with respect to ground, particularly for alternating currents.

The present invention provides a commutating circuit by means of which low voltage, low impedance signal sources can be successively coupled to a relatively high impedance output load while at the same time minimizing the effects of unwanted noise signals normally produced by circulating ground currents existing between the input and the output. The commutating means can be used with either single-ended or double-ended input circuits, as well as single-ended or double-ended output circuits.

In brief, the invention contemplates a commutating circuit involving a plurality of relay-operated switches. Each of the switches normally connects an associated capacitor across a respective one of a plurality of inputs. Each of the relay-operated switches is successively actuated to connect the respective capacitors across a common output.

Figure 1:
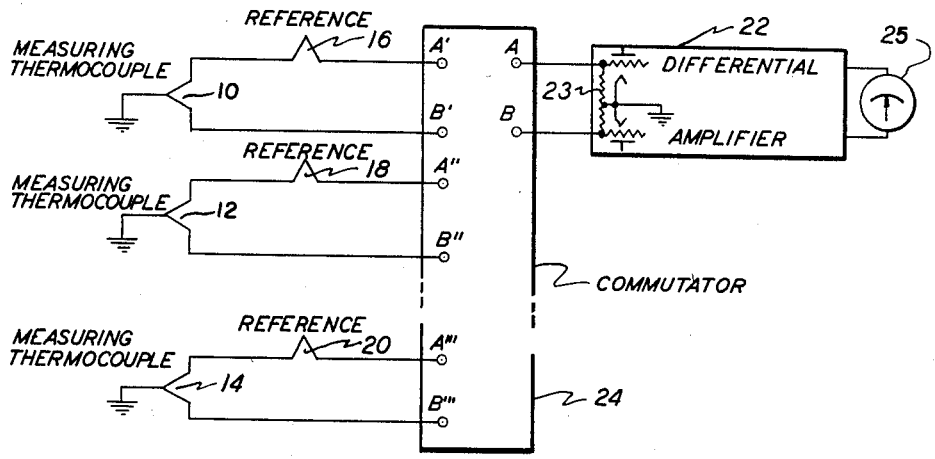
Figure 2:
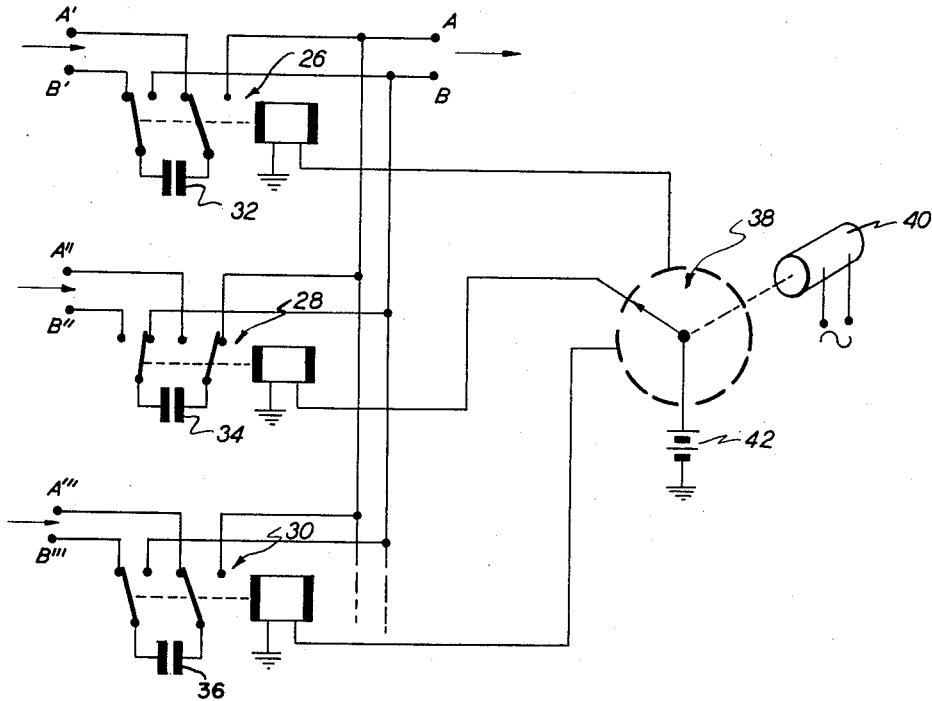

For a better understanding of the invention, reference should be had to the accompanying drawings, wherein:

Fig. 1 shows schematically a typical application of the commutator apparatus of the present invention; and Fig. 2 is a schematic circuit diagram of the commutating circuit.

Referring to Fig. 1 in detail, a typical application of the present invention may involve a plurality of temperature-measuring thermocouples, such as indicated at 10, 12, and 14. These thermocouples are each connected in series with a reference junction, such as indicated at 16, 18, and 20 respectively. In the usual application the temperature-measuring thermocouples may be distributed at various selected points about a structure. If the structure is metallic, the measuring thermocouples may all be thereby connected to a common ground. In taking temperature measurements, each of the measuring thermocouples is successively connected to suitable amplifying means, such as indicated at 22, by means of a commutator 24. The output of the amplifier 22 drives a meter 25 or other suitable indicating means for recording the measured temperatures.

Assume for the moment that the input terminals A' and B' are directly connected respectively to the output terminals A and B of the commutator 24. With the ground of the measuring thermocouple junction 10 being at a remote point with respect to the ground of the balanced input resistor load 23 of the differential amplifier 22, a D.C. potential as well as an A.C. voltage may exist between these ground points. It is a well-known phenomenon that with two ground points at widely separated positions and the ground return forming a closed loop conductive path with the circuit extending between these two ground points, alternating currents, referred to as ground loop currents, can be induced, as by stray fields produced by power leads and the like. By using a balanced input, as provided by the differential amplifier 22, these potentials or alternating currents are to some extent balanced out. However, the differential amplifier at best does not provide equal impedances on both sides of the grounded center-point of the balanced input, and consequently, an error voltage results across the input of the differential amplifier due to any potential difference produced by ground loop currents between the measuring thermocouple and the input of the differential amplifier. Since the load impedance on the input of the differential amplifier 22 is relatively high with respect to the impedance of the measuring thermocouple, and since the potentials produced by the measuring thermocouple are quite small, the error voltage introduced by the ground loop currents in the manner above described becomes appreciable.

Referring to Fig. 2, the improved commutator circuit of the present invention is shown, which eliminates any error voltages being produced across the input of the differential amplifier 22 by reason of circulating ground currents existing between two remotely grounded points. In particular, the commutator circuit comprises a plurality of relays such as indicated at 26, 28, and 30, there being one relay provided for each input channel to the commutator. Each relay includes a double-pole double-throw switch which normally connects the poles thereof across one of the input channels to the commutator. A storage capacitor, such as indicated at 32, 34, and 36, is connected across the poles of each of the relay-operated switches. Thus the capacitor 32 is normally connected across the input A'—B' of the commutator circuit, the capacitor 34 is normally connected across the input A"—B", and the capacitor 36 is normally coupled across the input A'''—B'''.

Each of the relays is arranged such that when the relay is energized, the associated storage capacitor is switched from the input source to the common output terminals A—B. Any suitable means, such as a mechanically rotated commutating switch 38, driven by motor 40, may be utilized to successively energize the relays from a common voltage source 42.

All of the relays are normally de-energized, and the capacitor associated with each input channel is charged to the potential produced by the measuring thermocouple. Inasmuch as the impedance of the input circuit provided by the thermocouples is quite low, charging time of the capacitors is small compared to the sampling period provided by the commutator. Thus the capacitors are charged to the full potential of the respective input channels. As each relay is energized in succession, the associated capacitor is switched from the input circuit to the output circuit of the commutator. Since the load connected to the commutator, as provided by the input to the differential amplifier 22, is relatively high, the time constant of the storage capacitors and the load circuit is long compared to the period that each relay is energized. Thus the voltages stored on the capacitors are not significantly discharged during the sampling periods. The commutator output therefore consists of a train of pulses, the amplitude of each pulse accurately representing the input voltage level of one of the input circuits to the commutator. Any suitable means can be used for recording the amplitudes of these pulses, such as an oscillograph.

The size of the storage capacitors in the commutator depends on the sampling rate of the commutator, the output impedance of the signal source, and the input impedance of the differential amplifier load. The capacitor must be small enough that the time constant formed with the source impedance will be short enough to permit the capacitor to charge to the peak value of the signal voltage in a shorter time than the period between samples of the same channel. Since the source impedance is relatively low, and since the sampling period may be relatively long, particularly where there are a large number of input channels, these factors do not generally impose any serious limitation on the maximum capacity of the storage capacitors. The capacitors of course must be large enough in capacity so as not to discharge significantly during the switching period. A large value of capacitance of the storage capacitors reduces or eliminates noise pickup in the input circuits since the storage capacitors provide a very low impedance to power line frequencies and other sources of noise voltages.

From the above description it will be seen that the commutator provides complete isolation between the input circuits and the output circuit. By reason of this isolation, the load on the commutator can be single-ended with one side grounded if desired, or can be double-ended in the manner shown in Fig. 1. Moreover, the signal source can be floating above ground or can be grounded, as desired. The A.C. or D.C. potential differences between the ground terminal of the signal source and the ground terminal of the output load of the commutator cannot produce any error voltages in the output load.

Another feature of the commutator arrangement of the present invention is that the D.C. load imposed on the respective input circuits is very light, being equal to the leakage resistance of the storage capacitors. Thus negligible loading is introduced to the input circuits over a wide range of signal source impedances.

While a specific commutator circuit and application therefor is shown and described above, it will be appreciated that various modifications are available within the scope of the invention. For example, other types of switching means may be used in the commutator, such as well-known electronic switching circuits, where higher switching speeds are desired. Also, other types of commutating switches may be used in place of the rotary switch illustrated. For example, ring counters or similar types of circuits may be used for successively switching the different input channels to the common output of the commutator circuit.

What is claimed is:

1. A commutator circuit for successively connecting a plurality of isolated low level voltage signals each established across a pair of terminals to a common two-terminal output, comprising a plurality of capacitors equal in number to the number of sources to be commutated, a plurality of double-pole double-throw relay-operated switches, each of the switches being arranged to normally connect both ends of an associated one of the capacitors across the two terminals of a respective one of said sources, each of the relay switches when actuated being arranged to disconnect both ends of the associated capacitor from the source and connect both ends of the capacitor across the common load, and motor driven commutating means for successively actuating momentarily each of the relay switches, whereby the capacitors are successively connected across the common load.

2. A commutator circuit for successively connecting a plurality of isolated low level voltage signals each established across a pair of terminals to a common two-terminal output, comprising a plurality of capacitors equal in number to the number of sources to be commutated, a plurality of double-pole double-throw switching means, each of the switching means arranged to normally connect both ends of an associated one of the capacitors across the two terminals of a respective one of said sources, each of the switching means when actuated being arranged to disconnect both ends of the associated capacitor from the source and connect both ends of the capacitor across the common load, and motor driven commutating means for successively actuating momentarily each of the switching means, whereby the capacitors are successively connected across the common load.

3. A commutator circuit for successively connecting a plurality of signals to a common two-terminal output, comprising a plurality of capacitors equal in number to the number of signals to be commutated, switching means arranged to normally connect an associated one of the capacitors across the source of a respective one of said signals, each of the switching means when actuated being arranged to disconnect both ends of the associated capacitor from the source and connect both ends of the associated capacitor across the common output, and means for successively actuating momentarily each of the switching means whereby the capacitors are successively connected momentarily across the common output.

4. Apparatus as defined in claim 1, wherein the time constants of the capacitors in circuit with the sources of input signals being short compared to the time constants of one of the capacitors in circuit with the common load.

5. A commutator circuit for successively connecting a plurality of low signal level, low impedance sources to a high impedance load, said circuit comprising a plurality of storage capacitors equal in number to the number of signal sources to be sampled by the commutator circuit, means normally connecting both ends of each of the capacitors across a corresponding one of the signal sources, whereby the capacitors are charged to the potentials of the respective sources, and means for successively disconnecting both ends of the storage capacitors from the associated sources and connecting the storage capacitors momentarily across the load, the capacity of the storage capacitors being such that the discharge time constant of any one of the capacitors when connected across the load is large compared to the time any one capacitor is connected across the load by said last-named means.

References Cited in the file of this patent

UNITED STATES PATENTS

| 2,146,977 | Nilsson | Feb. 14, 1939 |
| 2,275,635 | Lindenblad | Mar. 10, 1942 |
| 2,567,749 | Winter et al. | Sept. 11, 1951 |
| 2,838,692 | Richardson | June 10, 1958 |